Sept. 6, 1949.  H. P. WOLFRUM  2,481,461
BALL AND SOCKET IMPLEMENT COUPLER
Filed July 17, 1947  2 Sheets-Sheet 1
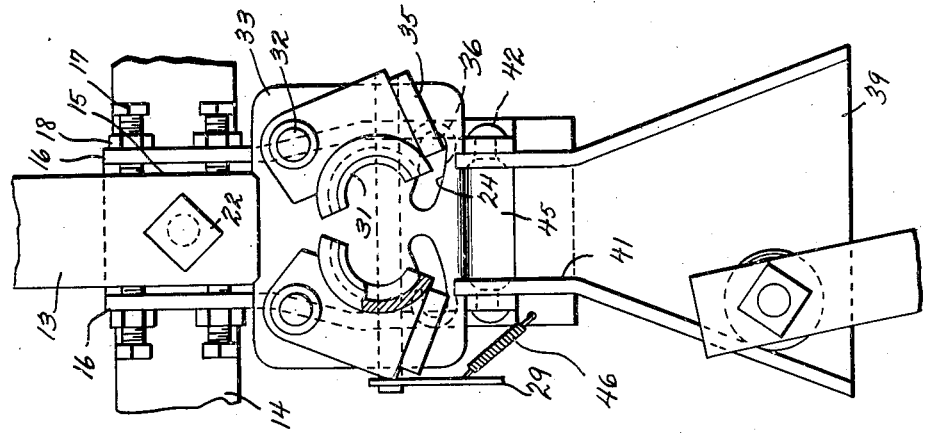
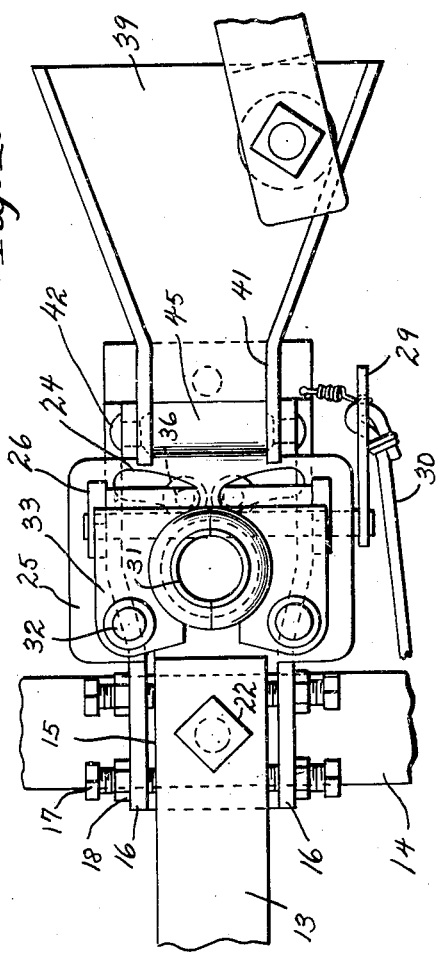
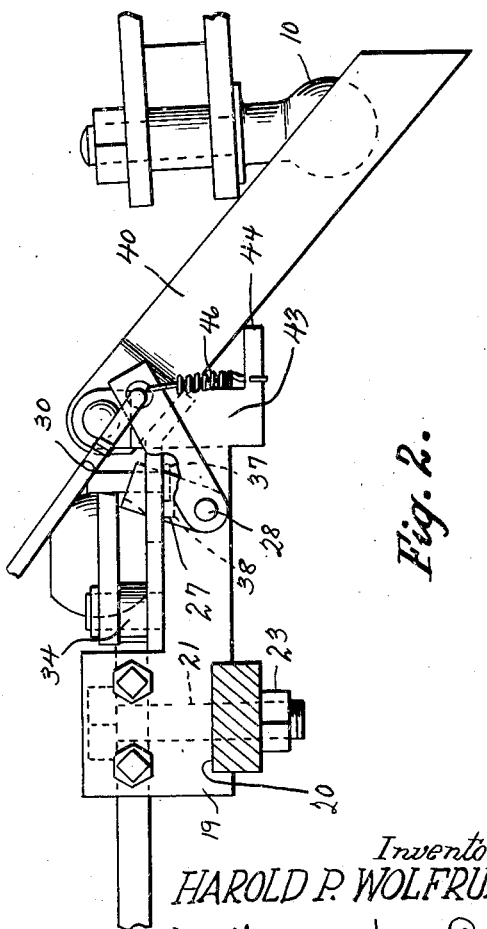
Inventor
HAROLD P. WOLFRUM
by Wilkinson & Mawhinney
Attorneys Sept. 6, 1949.         H. P. WOLFRUM         2,481,461
BALL AND SOCKET IMPLEMENT COUPLER
Filed July 17, 1947                  2 Sheets-Sheet 2

Inventor
HAROLD P. WOLFRUM
by Wilkinson & Mawhinney
Attorneys

Patented Sept. 6, 1949

2,481,461

UNITED STATES PATENT OFFICE 2,481,461

BALL-AND-SOCKET IMPLEMENT COUPLER

Harold P. Wolfrum, Defiance, Ohio

Application July 17, 1947, Serial No. 761,645

2 Claims. (Cl. 280—33.17)

The present invention relates to improvements in implement couplers and pole supports and more particularly resides in a tractor hitch whereby the tractor may automatically couple to such implements as combines, corn pickers, wagons, trailers and the like.

An object of the invention is to provide an improved coupler in which the coupling action will be automatic and incident to the backing of the tractor to the coupler in which a ball carried by a pole on the coupler is directed between normally open jaws on the tractor, the jaws being so pivotally arranged and constructed that in moving into the same the ball will automatically close the jaws thereon and effect the locking engagement between the two parts of the coupler.

A further object of the invention resides in providing an improved locking means by which the jaws are retained in the locked position upon the implement ball until such time as positive release is effected as by the pulling of a cable by the operator of the tractor from a position convenient to his seat.

A still further object of the invention resides in providing an improved frame structure capable of easy mounting upon the draw bars of the tractor and carrying the pivoted jaws in a compact manner in combination with a hinged and freely movable gathering apron which automatically guides the ball to a position between the jaws.

With the foregoing and other objects in view the invention will be more fully described hereinafter and more particularly pointed out in the appended claims.

Figure 4:
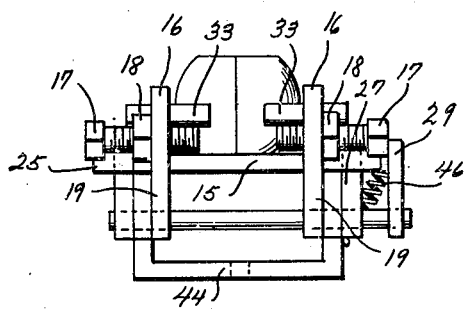
Figure 6:
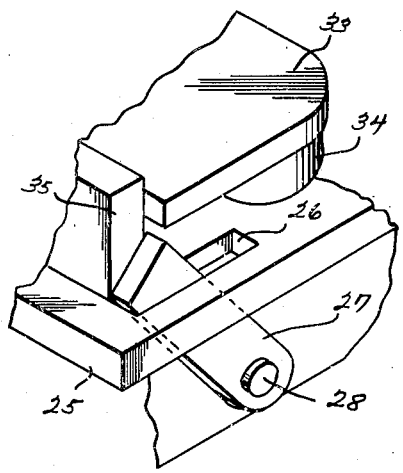
Figure 5:
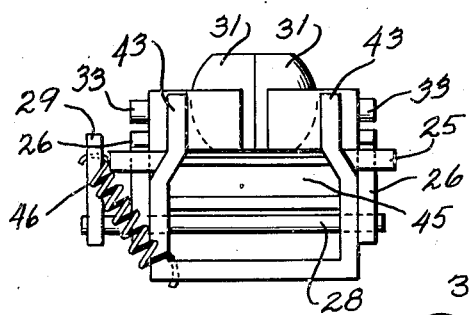
Figure 7:
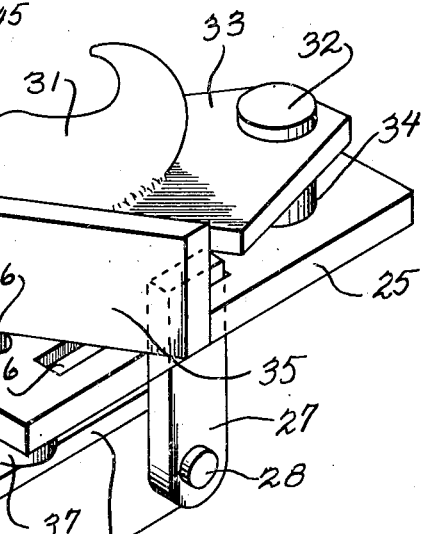

In the drawings in which like reference characters refer to like parts throughout the several views Figure 1 is a top plan view of an improved implement coupler constructed in accordance with the present invention with the jaws in the closed position, Figure 2 is a side elevational view of the same with parts broken away and parts shown in section, Figure 3 is a view similar to Figure 1 but with the jaws open, Figure 4 is a rear elevational view taken from the left end of Figure 3 with the tractor draw bar omitted, Figure 5 is a front elevational view of the tractor unit with the gathering apron removed and taken from the right-hand end of Figure 2, Figure 6 is a fragmentary perspective view, taken on an enlarged scale, of the locking device shown in the locked position, and Figure 7 is a similar view with the parts in the release position.

Referring more particularly to the drawings, 10 designates a ball carried upon a pole 11 which is attached to and projects forwardly from an implement, such as a combine, corn picker, wagon, trailer or the like.

On the tractor there is the usual longitudinal tractor draw bar 13 and in some cases a cross draw bar 14.

The tractor element of the coupler is carried upon a base plate 15 having upstanding side walls 16 which receive therebetween the rear end of the longitudinal draw bar 13, the latter being held thereto and centered therein by a number of screws 17 which are threadedly engaged through the walls 16 and have lock nuts 18 by which the screws are retained in adjusted position.

Below the plate 15 are depending walls 19 having recesses 20 for receiving the cross draw bar 14.

A bolt 21 passes through registered openings in the draw bars and in the base plate 15. The head of this bolt 22 is shown as resting upon the upper surface of the draw bar 13, while a nut 23 threaded on the bolt 21 engages beneath the cross draw bar 14.

In the forward portion of the plate 15 are arcuate slots 24 extending generally transversely of the plate. In lateral extensions 25 of the base plate 15 are longitudinal slots 26 in which play rocker bolts 27 made fast on a rock shaft 28 adapted to be rotated by a lever 29 which extends at one side of the base plate 15. A cable release 30 is attached to the lever 29 and runs to a position convenient to the driver's seat of the tractor.

A pair of hemispherical jaws 31, being counterparts of the ball 10 are rotatably mounted about pivots 32 having substantially vertical axes. The jaws 31 may be carried by webs 33 which directly receive the pivot pins 32, such pivot pins being carried in bearing spacers 34 mounted upon the plate 15.

Depending from the forward edges of the webs 33 which in effect form parts of the jaws 31 are lock striker flanges 35 having downwardly extending pins 36 terminating at their lower ends in enlarged heads 37. The pins slide in the arcuate slots 24 in accompaniment to the pivotal movement of the jaws 31 about their axes 32, for which compare Figures 1 and 3. The slots 24 are struck on radii from the centers of the pins 32.

A gathering apron 39 depends at the rear of the tractor unit and is formed with upstanding flanges 40 which converge forwardly and provide a restricted throat 41 leading to the space between the jaws 31. The apron has a pivotal movement in a vertical plane by reason of the fact that the forward ends of the flanges 40 are carried by the pivots 42, such pivots being mounted in the upper ends of vertical arms 43 carried upon the forward ends of the walls 19. These arms also carry a stop step 44 which extends rearwardly therefrom at a stepped down distance below the plate 15 and rearwardly of the pivots 42. In other words this step 44 is positioned to receive the gathering apron 39 and supports it in a properly inclined position to intercept the ball 10. The pivotal mounting 42 of the apron 39 permits the same to automatically rise when the tractor passes over obstacles that encounter the apron in this lowered position.

The rear end of the plate 15 is curved rearwardly and downwardly to form a curved throat floor 45 which in the lowered position of the apron forms a continuation of the apron floor to guide the ball 10 into the socket provided by the jaws 31.

A coil spring 46 is connected to the free end of the lever 29 and the stop step 44 in order to bias the rocker bolts 27 to a locking position.

In the use of the device, an implement equipped with the pole 11 and ball 10 is so arranged that the ball 10 rides up the apron as the tractor moves backwardly. The ball will thus be guided to the throat 41 and over the floor 45 and thus into the space between the jaws 31 which are at this time in the open condition shown in Figure 3. The act of the ball 10 entering the jaws will strike the forward portions of the same which are offset inwardly from the pivots 2, thus rotating the jaws mutually toward one another and upon the ball 10 so that the ball becomes clamped tightly therebetween. This motion is guided by the pins 36 moving in the arcuate slots 34. These pins also engage the curved walls of the slots 24 and stabilize the jaws 31 and their webs 33. The pins 36 and slots 34 perform a further function in that the end walls of the slots 24 act as stops when engaged by the pins 36 particularly in arresting the opening movements of the jaws beyond a point where the ball 10 could properly strike the forward portions of such jaws to effect the automatic locking movement heretofore described.

When the jaws are thus closed together, the rocker bolts 27 which are held in the forward position by the lock strike flanges 35 when the jaws are open are permitted to rotate backwardly in slots 26 moving across the outer ends of the flanges 35. This movement is achieved by the spring 46 as soon as the flanges 35 clear the slots 26.

The implement is now effectually hitched to the tractor and can be drawn about the field to perform its essential operations. When the implement is to be released from the tractor, the operator pulls upon the cable or chain 30 which rotates the lever 29 and the rocking bolts 27 forwardly to release the bolts from blocking the outer ends of the flanges 35; thus permitting the jaws to be opened; and as soon as opened the flanges 35 interpose barriers to the return forward movement of the rocker bolts 27. Thus as long as the jaws 31 remain in the open position, the spring 46 is stretched under tension and possesses the necessary potential energy to lock the jaws immediately they are closed by the action of the ball 10 in entering between same.

The device provides for automatic uncoupling in that when the cable release 30 is pulled forwardly to rock the locking bolts 27 forwardly out of the paths of the flanges 35, the tractor may be driven forwardly, which will react to cause the rear curved portions of the jaws to slide outwardly away from the ball permitting the passage of same therethrough.

It will be understood that I have disclosed only one embodiment of which the invention is susceptible but such invention may be incorporated in a variety of forms all of which are within the purview of the invention provided the same fall within the scope of the following claims.

I claim:

1. An implement coupler comprising a plate, means whereby said plate is attached to the rear portion of a tractor, side extensions on said plate having longitudinal slots therein, rocking bolts playing in said slots, means for biasing said bolts to a rear locking position, means for swinging said bolts to a forward release position, pivoted jaws above and adjoining said bolts having dependent parts adapted to engage the sides of the bolts when the jaws are closed and adapted to extend in rear of the bolts when the jaws are open to prevent the bolts from moving to locked position, and a ball adapted to be carried by the implement for entering between said jaws.

2. For use with a vehicle, an implement coupler comprising a ball on the implement and a socket on the tractor, said socket formed from laterally movable jaws having forward parts extending into the path of the ball whereby the jaws are closed on the ball by the rear movement of the jaws with reference to the ball, said jaws being pivoted to swing in a substantially horizontal plane with the pivots arranged at the forward outer corner portions of the jaws, a support on the vehicle for said jaws having arcuate slots therein struck from the centers of the pivots, guide and stop pins on said jaws slidable in said arcuate slots, normally locked means for engaging the side portions of said jaws for preventing the accidental opening of the jaws, and means for withdrawing said locking means from locked position to permit opening of the jaws.

HAROLD P. WOLFRUM.

REFERENCES CITED

The following references are of record in the file of this patent:

UNITED STATES PATENTS

| Number | Name | Date |
|---|---|---|
| 529,396 | Lohr | Nov. 20, 1894 |
| 1,336,181 | Anderson | Apr. 6, 1920 |
| 1,354,589 | Thoreson | Oct. 5, 1920 |
| 2,056,525 | Johnson et al. | Oct. 6, 1936 |
| 2,078,851 | Hovey | Apr. 27, 1937 |
| 2,151,181 | Appell | Mar. 21, 1939 |
| 2,159,395 | Mersereau | May 23, 1939 |
| 2,230,242 | Goodrich | Feb. 4, 1941 |
| 2,322,446 | Hudson | June 22, 1943 |
| 2,347,033 | Daton | Apr. 18, 1944 |